United States Patent [19]

Strolle et al.

[11] 4,338,379

[45] Jul. 6, 1982

[54] HIGH-SOLIDS THERMOSETTING ENAMEL COATING COMPOSITION

[75] Inventors: Clifford H. Strolle, Springfield, Pa.; Glenn D. Thornley, Wilmington, Del.

[73] Assignee: E. I. Du Pont de Nemours and Company, Wilmington, Del.

[21] Appl. No.: 234,583

[22] Filed: Feb. 13, 1981

[51] Int. Cl.³ .............................................. B32B 27/08
[52] U.S. Cl. ................................ 428/520; 525/162; 428/482; 524/512
[58] Field of Search ............... 525/162; 260/31.4 R; 428/482, 520

[56] References Cited

U.S. PATENT DOCUMENTS

| | | | |
|---|---|---|---|
| 3,098,835 | 7/1963 | Gaylord | 260/33.6 |
| 3,382,294 | 5/1968 | Christenson et al. | 260/850 |
| 3,402,219 | 9/1968 | Hill et al. | 260/850 |
| 3,745,137 | 7/1973 | Reid et al. | 260/33.6 |
| 3,994,851 | 4/1976 | Chang | 260/29.4 R |
| 4,020,216 | 4/1977 | Miller | 428/425 |
| 4,076,766 | 2/1978 | Simms | 260/850 |

*Primary Examiner*—Joseph L. Schofer
*Assistant Examiner*—Bernard Lipman

[57] ABSTRACT

A thermosetting coating composition, useful as an automotive finish, has film-forming constituents of a low molecular weight hydroxyl-functional acrylic copolymer, a low molecular weight hydroxyl-functional polyester based on branched-chain glycols, and an aminoplast resin. The composition can be applied at environmentally-acceptable solids levels and cured at commercially acceptable temperatures to form a durable film.

12 Claims, No Drawings

HIGH-SOLIDS THERMOSETTING ENAMEL COATING COMPOSITION

BACKGROUND OF THE INVENTION

1. Field of the Invention

This invention relates to a thermosetting enamel coating composition wherein low molecular weight polyester and addition polymers that have controlled hydroxyl-functionality are crosslinked at cure with aminoplast resins.

2. Description of the Prior Art

Conventional enamel coating compositions have been produced using hydroxyl-functional acrylic and polyester components that are thermoset by crosslinking with aminoplast resins. Such coatings have highly desirable properties in most instances and are therefore quite useful for specific applications. For example, U.S. Pat. No. 4,076,766, issued Feb. 28, 1978 to Simms discloses such a coating composition useful for coating flexible materials.

In past attempts to use thermosetting acrylic-polyester coating compositions as automotive finishes, the problem of having to sacrifice one desirable quality to enhance another has often been encountered. For example, compositions that are high in acrylic content normally have high gloss but may be susceptible to low-temperature cracking. Those high in polyester content may not suffer this problem, but may exhibit a loss of gloss upon sanding. Further complications arise from the current emphasis on reduction of solvent emissions, which often requires high solids levels in the coating compositions. High solids thermosetting coating compositions have in the past often lacked the flexibility and aesthetic qualities necessary for use as automotive finishes.

Therefore, there remains a need for a thermosetting enamel coating composition that can be applied at high solids levels and that also retains the other qualities necessary in an automotive finish.

SUMMARY OF THE INVENTION

The present invention combines relatively specific acrylic and polyester components with an aminoplast crosslinking agent to provide a high-solids coating composition that retains a balance of properties desirable in an automotive finish. More particularly, there is provided by the present invention a thermosetting enamel coating composition of a mixture of a polymer blend and a solvent for the polymer blend wherein the blend is 64–90% by weight of the mixture and consists essentially of (a) 5–25% by weight, based on the weight of the blend, of a copolymer of
  (1) a hydroxyalkyl ester of acrylic or methacrylic acid wherein the alkyl group has 2–10 carbon atoms and wherein the hydroxyalkyl ester is 25–35% by weight of the copolymer, and
  (2) at least one other ethylenically unsaturated monomer selected from the group consisting of vinyl chloride, vinylidene chloride, ethylene, propylene, vinyl acetate, conjugated dienes, styrene, alkyl-substituted styrene, dibutyl maleate, $C_1$–$C_{12}$ alkyl esters of acrylic acid, $C_1$–$C_{12}$ alkyl esters of methacrylic acid, and mixtures of these wherein the copolymer has a hydroxyl content of 2–6% by weight;

(b) 40–60% by weight, based on the weight of the blend, of a saturated polyester polyol that is the reaction product of
  (1) pentaerythritol and at least one other branched-chain glycol wherein the molar ratio of glycol to pentaerythritol is from 2:1 to 6:1,
  (2) an aromatic or saturated aliphatic monocarboxylic acid having no more than 18 carbon atoms, and
  (3) a mixture of an aromatic and a saturated aliphatic acid wherein the molar ratio of aromatic acid to aliphatic acid is from 2:1 to 6:1
wherein the polyol has a hydroxyl content of 5–9% by weight; and
  (c) 25–45% by weight, based on the weight of the blend, of an aminoplast resin.

DETAILED DESCRIPTION OF THE INVENTION

The high-solids thermosetting enamel coating composition of the present invention is composed primarily of a film-forming polymer blend and a solvent for the blend, although it can optionally also contain pigments, a reaction catalyst to decrease the curing time, and any of the various additives that are advantageously used in coating compositions for automotive finishes. The polymer blend consists essentially of a hydroxyl-functional acrylic copolymer, a polyester polyol, and an aminoplast resin crosslinking agent. The polymer blend constitutes 65–90%, preferably 70–80%, of the combined weight of the blend and the solvent.

The hydroxyl-functional acrylic copolymer used in the present invention is prepared by copolymerizing at least one hydroxyalkyl ester of acrylic or methacrylic acid with at least one other ethylenically-unsaturated monomer. The copolymer constitutes 5–25% by weight, preferably 10–20% by weight, of the film-forming polymer blend.

The hydroxyalkyl ester preferably has 2–10 carbon atoms in the alkyl group. Typical are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxybutyl acrylate, and hydroxyoctyl acrylate. Most preferred are hydroxyalkyl acrylates and methacrylates in which the hydroxyl group is primary and the alkyl group has 2–4 carbon atoms. The hydroxyalkyl ester preferably makes up 25–35% by weight of the copolymer.

The other ethylenically unsaturated monomers that can be copolymerized with the above hydroxylalkyl esters are any of those conventionally used in film-forming polymers. Examples of such monomers are vinyl chloride, vinylidene chloride, olefins such as ethylene or propylene, vinyl acetate, conjugated dienes of 4 to 10 carbon atoms such as butadiene, styrene, alkyl substituted styrenes such as α-methyl styrene, alkyl maleates such as dibutyl maleate, esters of methacrylic acid and acrylic acid, preferably alkyl esters having 1–12 carbon atoms in the alkyl group, such as methyl methacrylate, ethyl methacrylate, propyl methacrylate, butyl methacrylate, hexyl methacrylate, 2-ethylhexyl methacrylate, lauryl methacrylate and the like, methyl acrylate, ethyl acrylate, propyl acrylate, butyl acrylate, hexyl acrylate, lauryl acrylate and the like. Mixtures of these monomers can also be used.

The co-polymerization of the monomeric constitutes is preferably accomplished in an inert organic solvent in the presence of a free-radical initiator of the peroxide or azo type. Typical solvents are aromatics, esters, ethers, ketones, and the like. Examples are benzene, toluene, xylene, butyl acetate, ethylene glycol monoethyl ether acetate, acetone, methylisobutyl ketone, and methyl ethyl ketone. Useful initiators are, for example, benzoyl peroxide, lauroyl peroxide, ditertiary butyl peroxide, cumene hydroperoxide, and azoisobutyric acid dinitrile. Conventional polymerization temperatures, based on reflux, are used, preferably in the range of 50° C. to about 200° C. The reaction is carried out to the point that the copolymer has a number average molecular weight (as determined by gel permeation chromatography having polystyrene standards) of 1000 to 5500, preferably 4000 to 5000. The hydroxyl content of the resultant polymer should be about 2–6% by weight, with a range of 4–5.5% being most preferred.

It has been found that an especially useful copolymer for the present invention consists essentially of monomer units of styrene, 20–30% by weight; ethyl methacrylate, 20–30% by weight; lauryl methacrylate, 10–30% by weight; and hydroxyethyl acrylate, 25–35% by weight. Another preferred copolymer consists essentially of monomer units of methyl methacrylate, 40–60% by weight; lauryl methacrylate, 10–30% by weight; and hydroxyethyl acrylate, 24–35% by weight.

The polyester polyol used in the present invention constitutes 40–60% by weight, preferably 45–55% by weight, of the film-forming polymer blend. This polyol is the condensation-reaction product of pentaerythritol and a glycol, a monocarboxylic acid, and an aromatic and an aliphatic dicarboxylic acid.

The first set of reactants necessary to form the polyester polyol useful in the invention is pentaerythritol and at least one glycol of the branched-chain variety. It has been found that the incorporation of such a glycol and pentaerythritol into the polyester imparts the desired hardness and durability to the final cured film. Any branched-chain glycols are usable in the formation of this polyester, although it is preferred that these glycols contain no more than 8 carbon atoms. Neopentyl glycol and pinacol are examples of preferred branched-chain glycols. A particularly useful polyol is formed when the molar ratio of glycol to pentaerythritol is from 2:1 to about 6:1. A ratio of 3:1 to 4.5:1 is preferred.

The monocarboxylic acid component of the polyester polyol is present primarily to prevent molecular weight build-up of the polyol. To this end, it has been found that any aromatic or saturated aliphatic monocarboxylic acid, or mixtures of these, having 18 or fewer carbon atoms can be used. Normally, this acid will be used in a molar ratio of acid to pentaerythritol of about 1:1 to 2.5:1.

Examples of preferred aromatic monocarboxylic acids are benzoic acid, paratertiary butylbenzoic acid, triethyl benzoic acid, toluic acid, phenylacetic acid, and the like. Examples of preferred aliphatic acids are acetic acid, propionic acid, butyric acid, valeric acid, caproic acid, caprylic acid, pelargonic acid, capric acid, lauric acid, myristic acid, palmitic acid, stearic acid, or mixtures of these. Branched-chain aliphatic monocarboxylic acids can also be used. Most preferred are benzoic acid, lauric acid, and pelargonic acid.

The dicarboxylic acids useful in the formation of the polyester polyol have the general formula

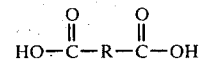

where R is saturated aliphatic or aromatic.

Preferred acids when R is aliphatic are those in which R has 2–10 carbon atoms. Most preferred of these are succinic acid. The aromatic dibasic acids that are preferred are phthalic, iso-phthalic, terephthalic, uritic, and cumidinic acids, although other aromatic dibasic acids could also be used.

Mixtures of these aromatic and aliphatic dicarboxylic acids can also be used. Nevertheless, whether mixtures of each kind of acid are used or whether only one of each kind of acid is used, the molar ratio of aromatic diacids to aliphatic diacids should have a range of about 2:1 to 6:1. A ratio of about 3:1 is preferred. It is to be further understood that the lower alkyl mono-or di-esters of these acids and the anhydrides, where applicable, of these acids can also be used in place of the acids themselves with equivalent results. If the above-mentioned esters are used, the alkyl groups preferably have no more than 5 carbon atoms.

The polyester polyol can typically be formed by charging the reactants and a suitable solvent into a reaction vessel. The reaction mixture is then heated to its reflux temperature, usually about 100°–300° C., and there maintained for a period of 1–8 hours. During this period the water of esterification is withdrawn. The reaction product, the polyester polyol, should have a number average molecular weight (determined by gel permeation chromatography based on polystyrene standards) of 150–1000, preferably 250–450. The reactants should be chosen also so that the polyester polyol has a hydroxyl content of 5–9% by weight, preferably 7–8% by weight.

The aminoplast resin crosslinking agents make up 25–45%, preferably 30–40%, by weight of the film-forming blend. The aminoplast resins are conventionally formed by condensing at least one aldehyde with urea, N,N-ethyleneurea, or an aminotriazine such as melamine or guanamine. Useful aldehydes are formaldehyde and its revertable polymers, paraformaldehyde, acetaldehyde, crotonaldehyde, and acrolein.

The aminoplast resins can be, and preferably are, alkylated with at least one and up to six alkanol molecules of 1–6 carbon atoms. The alkanols can be straight chain, branched, cyclic, or mixtures of these. Preferred are aminoplast resins that have been alkylated with methanol, butanol, or mixtures of these. Most preferred are the methylated melamineformaldehyde resins such as hexamethoxymethylmelamine.

The hydroxyl-containing copolymer and the polyester polyol, formed as described above, are each in solution and are suitable for direct use to form the coating composition of this invention by blending with each other and with the aminoplast resin. The final coating composition contains 65–90% by weight of the polymer blend and 10–35% by weight of a solvent for the blend, these percentages being based on the combined weights of the solvent and the blend. One of the useful aspects of the present invention is that it can be conveniently spray-applied even at these high weight-solids levels. The solvent of the final composition can be a mixture of the organic solvents in which the constituents of the polymer blend are each formed.

The composition of this invention can contain about 0.01–2% by weight, based on the weight of the polymer blend, of a curing catalyst. Particularly useful are acid catalysts such as organic sulfonic acids, acid phosphates such as methyl and butyl acid phosphate, acid pyrophosphates such as dimethyl acid pyrophosphates, and organic acid sulfate esters. Preferred are the sulfonic acids such as para-toluenesulfonic acid and dinonylnaphthalene disulfonic acid. The sulfonic acids can be neutralized with an amine, preferably a tertiary amine.

To provide the novel coating composition with other characteristics that may be desirable under some conditions, other compatible polymers may be blended with the coating composition, such as polymethyl methacrylate, polystyrene, and the like. For example, 20–40% by weight, based on the weight of the polymer blend, of polymethyl methacrylate decreases the drying time and enhances the gloss and appearance of the dried coating.

The coating composition of the invention can be pigmented, containing an amount of pigment in a pigment/polymer-blend weight ratio of about 0.2/1 to 70/1. Useful pigments are, for example, metallic oxides, such as titanium dioxide or zinc oxide; metal hydroxides; metal flakes, sulfides; sulfates; carbonates; carbon black; silica; talc; china clay; and organic dyes.

The pigments can be introduced into the coating composition by first forming a mill base with either the hydroxyl-containing copolymer, the polyester polyol, or both. The mill base can be formed, for example, by conventional sand-grinding or ball-milling techniques, and then can be blended, by simple stirring or agitation, with the other constituents of the coating composition.

The coating composition can further optionally contain an ultraviolet light stabilizer, an antioxidant, or both. The ultraviolet light stabilizer can be present in an amount of 1–20% by weight, based on the weight of the polymer blend; the antioxidant can be present in an amount of 0.1–5% by weight, based on the weight of the polymer blend.

Typical ultraviolet light stabilizers are benzophenones, triazoles, triazines, benzoates, lower alkyl thiomethylene-containing phenols, substituted benzenes, organophohphorous sulfides, and substituted methylene malonitriles. Particularly useful are the hindered amines and nickel compounds shown in U.S. Pat. No. 4,061,616 (Dec. 6, 1977).

Typical antioxidants are tetra-kis alkylene (di-alkyl hydroxy aryl) alkyl ester alkanes, reaction product of p-amino diphenylamine and glycidyl methacrylate, and alkyl hydroxyphenyl groups bonded through carboalkoxy linkages to a nitrogen atom of a heterocyclic nucleus containing an imidodicarbonyl group or an imidodithiocarbonyl group.

One preferred combination of ultraviolet light stabilizer and antioxidant is 2-hydroxy-4-dodecyloxy benzophenone or a substituted 2(2'-hydroxyphenyl) benzotriazole and tetra-kis methylene 3-(3',5'-dibutyl-4'-hydroxyphenyl) propionate methane.

The coating composition of this invention can be applied to a variety of substrates by any of the conventional application methods such as spraying, dipping, brushing, or flow coating. Substrates that can be advantageously coated with the present composition are, for example, metal, steel, or various plastics such as polypropylene, polystyrene, copolymers of styrene, and the like. The coating is particularly suited for application over primed or unprimed metal or steel. Typical uses are for coating steel that has been treated with zinc phosphate, metal substrates pre-coated with conventional alkyd or epoxy primers, and galvanized steel. For automotive coatings, where the present invention finds its greatest utility, the composition can be spray-applied over a metal or steel substrate that has been pre-coated with an alkyd or epoxy primer. The coating can be curing by heating at 50°–150° C. for 15 minutes to two hours.

It is further possible to apply the coating composition of the present invention as a two-coat system in which a first, pigmented coat is applied as previously described over the substrate and is then overlaid with a second, unpigmented coat. This can impart to the finish a gloss or appearance that is improved over that attainable when a single coat system is used. Enhancement of these properties is particularly desirable in automotive finishes. When such a two-coat system is employed, however, the first coat should be allowed to cure to a point where it is tack-free before the second coat is applied. This will normally prevent the solvent in the second coat from attacking the first coat. This attack, or strike-in, can cause the polymer blends of the two coats to combine at the coats' interface, negating the improvement in the gloss of appearance.

Irrespective of whether a one-coat or two-coat system is used, however, the cured coating is hard, durable, scratch and stain resistant, weather resistant, and chemical and solvent resistant. In addition to being useful for coating automobile and truck bodies, it can also be used to coat appliances, and any industrial equipment.

The following example illustrates the best mode of the invention.

EXAMPLE

The following 3 ingredients are prepared as follows:

| 1. Copolymer Solution | |
|---|---|
| | Parts By Weight |
| Portion 1 | |
| Ethylene glycol monoethyl ether acetate | 259.08 |
| Portion 2 | |
| Methyl methacrylate | 306.35 |
| Lauryl methacrylate | 122.54 |
| Hydroxyethyl acrylate | 183.81 |
| Ditertiary butyl peroxide | 20.22 |

Portion 1 is charged into a reaction vessel and heated to reflux, approximately 150° C. Reflux is maintained for 1 hour, after which time Portion 2 is added, with mixing, over a 7-hour period. The mixture is maintained at reflux during this time and for an additional 2-hours thereafter. The resulting copolymer has a hydroxyl content of 4.4% by weight (based on copolymer weight) and a number-average molecular weight (gel permeation chromatography) to 4700. The copolymer solution has a Gardner-Holdt viscosity of Z-4 and a solids content of 72% by weight.

| 2. Polyester Solution | |
|---|---|
| | Parts By Weight |
| Portion 1 | |
| Pentaerythritol | 94.16 |

-continued

2. Polyester Solution

| | Parts By Weight |
|---|---|
| Benzoic acid | 168.94 |
| Neopentyl glycol | 288.00 |
| Isophthalic acid | 143.70 |
| Phthalic anhydride | 128.09 |
| Adipic acid | 63.17 |
| Xylene | 35.03 |
| Portion 2 | |
| Ethyl acetate | 107.71 |

Portion 1 is charged into a reaction vessel equipped with an agitator and vapor condenser, and is heated quickly to 215° C. This temperature is maintained until the reaction is completed, determined by monitoring the flow of the water of esterification from the condenser. Total water collected is 84.8 parts by weight. The mixture in the reaction vessel is cooled to 80° C., and Portion 2 is added. This mixture is agitated for 1 hour and then filtered. The resulting reaction product, the polyester polyol, has a hydroxyl content of 7.7% by weight (based on product solids weight) and a number average molecular weight (gel permeation chromatography) of 340. The polyester solution has a Gardner Holdt viscosity of Z-2 and a solids content of 85% by weight.

3. Mill Base

| | Parts By Weight |
|---|---|
| Copolymer solution (ingredient 1) | 66.3 |
| Methyl isobutyl ketone | 35.9 |
| TiO$_2$ white pigment | 197.7 |

The ingredients are charged to a one-gallon porcelain mill that contains three quarts of pebbles. The mill base is formed by spinning the mixture of ingredients in the mill for 22 hours.

A coating composition is then prepared by mixing the following ingredients:

| | Parts By Weight |
|---|---|
| Copolymer solution (ingredient 1) | 4.66 |
| Polyester solution (ingredient 2) | 58.82 |
| Mill base (ingredient 3) | 75.86 |
| Hexamethoxymethylmelamine | 35.00 |
| Paratoluene sulfonic acid (18% by weight in methanol and dimethyl oxazolidine) | 3.34 |

In the resulting coating composition, the polymer blend (copolymer, polyester, and aminoplast) is 80% by weight of the combined weight of the polymer blend and solvent. The composition is reduced to a spray viscosity of 40 seconds (No. 2 Fisher Cup) by the addition of 30 parts of methyl isobutyl ketone. At this point, the polymer blend is about 65% by weight of the combined weight of the polymer blend and solvent. Including pigment, the coating composition is 74% solids by weight.

The coating composition is sprayed in two passes onto polished steel panels that had been primed with a conventional automotive primer. The panels were heated for 30 minutes at 120° C. to dry and to cure the coatings. The film thickness is approximately 2 mils. When then tested, the coating has a knoop hardness of 12.1 and gloss measurements of 96.8 at 60° and 89.3 at 20°. The coating is resistant to salt spray and can be found to be immune from attack by common organic solvents.

We claim:

1. A thermosetting enamel coating composition of a mixture of a polymer blend and a solvent for the polymer blend wherein the blend is 65-90% by weight of the mixture and consists essentially of
    (a) 5-25% by weight, based on the weight of the blend, of a copolymer of
        (1) a hydroxyalkyl ester of acrylic or methacrylic acid wherein the alkyl group has 2-10 carbon atoms and wherein the hydroxyalkyl ester is 25-35% by weight of the copolymer, and
        (2) at least one other ethylenically unsaturated monomer selected from the group consisting of vinyl chloride, vinylidene chloride, ethylene, propylene, vinyl acetate, conjugated dienes, styrene, alkyl-substituted styrene, dibutyl maleate, $C_1$–$C_{12}$ alkyl esters of acrylic acid, $C_1$–$C_{12}$ alkyl esters of methacrylic acid, and mixtures of these wherein the copolymer has a hydroxyl content of 2-6% by weight;
    (b) 40-60% by weight, based on the weight of the blend, of a saturated polyester polyol that is the reaction product of
        (1) pentaerythritol and at least one other branched-chain glycol wherein the molar ratio of glycol to pentaerythritol is from 2:1 to 6:1,
        (2) and aromatic or saturated aliphatic monocarboxylic acid having no more than 18 carbon atoms, and
        (3) a mixture of an aromatic and a saturated aliphatic acid wherein the molar ratio of aromatic acid to aliphatic acid is from 2:1 to 6:1
    wherein the polyol has a hydroxyl content of 5-9% by weight; and
    (c) 25-45% by weight, based on the weight of the blend, of an aminoplast resin.

2. The coating composition of claim 1 wherein the copolymer is of hydroxyethyl acrylate, styrene, and at least one other alkyl methacrylate.

3. The coating composition of claim 1 wherein the copolymer is of hydroxyethyl acrylate, lauryl methacrylate, and at least one other alkyl methacrylate.

4. The coating composition of claim 2 or 3 wherein the branched-chain glycol is neopentyl glycol; the monocarboxylic acid is selected from the group consisting of benzoic acid, lauric acid, pelargonic acid, and mixtures of these; and aromatic dicarboxylic acid is selected from the group consisting of phthalic acid, isophthalic acid, terephthalic acid, and mixtures of these; and the aliphatic dicarboxylic acid is selected from the group consisting of succinic acid, glutaric acid, adipic acid, pimelic acid, and mixtures of these.

5. The coating composition of claim 1 wherein the copolymer is of hydroxyethyl acrylate, methyl methacrylate, and lauryl methacrylate and wherein the polyester polyol is the reaction product of pentaerythritol, neopentyl glycol, benzoic acid, isophthalic acid, phthalic acid, and adipic acid.

6. The coating composition of claim 1 wherein the copolymer is of hydroxyethyl acrylate, lauryl methacrylate, ethyl methacrylate, and styrene, and wherein the polyester polyol is the reaction product of pentaerythritol, neopentyl glycol, lauric acid, isophthalic acid, phthalic acid, and adipic acid.

7. The coating composition of claim 1, 2, 3, 5, or 6 additionally containing pigment.

8. The coating composition of claim 1, 2, 3, 5, or 6 additionally containing an ultraviolet light stabilizer and an oxidant.

9. A substrate coated with a first cured coating composition according to claim 1 overlaid with a second cured coating composition according to claim 1 wherein the first composition contains pigment and wherein the second composition is unpigmented.

10. The substrate of claim 9 wherein the first cured coating composition additionally contains an ultraviolet light stabilizer.

11. The substrate of claim 10 wherein the first cured coating composition additionally contains an antioxidant.

12. The substrate of claim 11 wherein the second cured coating composition additionally contains an ultraviolet light stabilizer and antioxidant.

* * * * *